United States Patent
Singh et al.

(10) Patent No.: US 12,069,565 B2
(45) Date of Patent: Aug. 20, 2024

(54) DYNAMIC CELL SELECTION FOR RADIO NETWORK OPTIMIZATION

(71) Applicant: NOKIA SOLUTIONS AND NETWORKS OY, Espoo (FI)

(72) Inventors: Vaibhav Singh, New Delhi (IN); Parijat Bhattacharjee, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 540 days.

(21) Appl. No.: 17/274,652

(22) PCT Filed: Aug. 29, 2019

(86) PCT No.: PCT/EP2019/073052
§ 371 (c)(1),
(2) Date: Mar. 9, 2021

(87) PCT Pub. No.: WO2020/052982
PCT Pub. Date: Mar. 19, 2020

(65) Prior Publication Data
US 2021/0345233 A1 Nov. 4, 2021

(30) Foreign Application Priority Data
Sep. 12, 2018 (IN) .............................. 201841034440

(51) Int. Cl.
*H04W 4/00* (2018.01)
*H04W 24/02* (2009.01)
(Continued)

(52) U.S. Cl.
CPC ........... *H04W 48/16* (2013.01); *H04W 24/02* (2013.01); *H04W 48/20* (2013.01)

(58) Field of Classification Search
CPC ...... H04W 48/16; H04W 48/20; H04W 24/02
(Continued)

(56) References Cited

U.S. PATENT DOCUMENTS 8,897,802 B2 11/2014 Meredith et al.
9,807,640 B2 10/2017 Chou et al.
(Continued)

FOREIGN PATENT DOCUMENTS

CN 103858513 A 6/2014
CN 106576259 A 4/2017
(Continued)

OTHER PUBLICATIONS

Office Action dated Dec. 2, 2022, corresponding to Indian Patent Application No. 201841034440.
(Continued)

*Primary Examiner* — Temica M Beamer
(74) *Attorney, Agent, or Firm* — SQUIRE PATTON BOGGS (US) LLP

(57) ABSTRACT

Systems, methods, apparatuses, and computer program products for dynamic target cell selection for application of RAN optimization are provided. One method includes receiving a request, from one or more radio access network optimization services, that comprises a list of attributes corresponding to characteristics of a cell and a cell selection criterion for each of the attributes, receiving, from one or more radio access network cells, a data stream comprising metrics for at least one of the cell or users in the cell. The method may also include generating, based on the received request and the metrics, a list of zero or more cells that meet the selection criterion for one of the radio access network optimization services or for a group of the radio access network optimization services, and sending, to a respective one of said one or more radio access network optimization services, the generated list of said zero or more cells that meets the selection criterion for the respective one or more radio access network optimization services.

18 Claims, 7 Drawing Sheets

(51) Int. Cl.
H04W 48/16 (2009.01)
H04W 48/20 (2009.01)

(58) Field of Classification Search
USPC ........................................................ 455/434
See application file for complete search history.

(56) References Cited

U.S. PATENT DOCUMENTS

| | | | |
|---|---|---|---|
| 10,039,013 | B2 | 7/2018 | Periyasamy et al. |
| 2004/0117226 | A1 | 6/2004 | Laiho et al. |
| 2009/0234937 | A1* | 9/2009 | Buljore ............... H04W 24/02 709/220 |
| 2013/0272132 | A1 | 10/2013 | Heo et al. |
| 2014/0269364 | A1 | 9/2014 | Knapp et al. |
| 2015/0271681 | A1 | 9/2015 | Perez et al. |
| 2016/0044539 | A1 | 2/2016 | Yiu et al. |
| 2016/0345185 | A1 | 11/2016 | Broustis et al. |
| 2017/0019811 | A1 | 1/2017 | Parulkar |
| 2017/0367036 | A1 | 12/2017 | Chen et al. |

FOREIGN PATENT DOCUMENTS

| | | |
|---|---|---|
| EP | 3122099 A1 | 1/2017 |
| WO | 2009/041878 A1 | 4/2009 |
| WO | 2016/055980 A1 | 4/2016 |
| WO | WO 2018/073810 A1 | 4/2018 |

OTHER PUBLICATIONS

International Search Report & Written Opinion dated Nov. 15, 2019 corresponding to International Patent Application No. PCT/EP2019/073052.
O-RAN Alliance: "O-RAN: Towards an Open and Smart RAN," 3GPP Draft; O-RAN+WP+Final+181017, Sep. 16, 2019, XP051787159.
Communication pursuant to Article 94(3) EPC dated Feb. 7, 2023, corresponding to European Patent Application No. 19762748.2.
R. Ferrus et al., "Evaluation of a Cell Selection Framework for Radio Access Networks Considering Backhaul Resource Limitations," IEEE, 2007.
First Office Action dated Oct. 11, 2023 corresponding to Chinese Patent Application No. 201980068944.3, with English summary thereof.

* cited by examiner

DYNAMIC CELL SELECTION FOR RADIO NETWORK OPTIMIZATION

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to methods for enabling dynamic target cell selection for the application of radio access network (RAN) optimization algorithms.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRA radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in E-UTRAN or eNB in LTE) may be named gNB when built on NR radio and may be named NG-eNB when built on E-UTRA radio.

SUMMARY

One embodiment may be directed to a method that may include receiving a request from one or more radio access network optimization services. The request may include a list of attributes corresponding to characteristics of a cell and a cell selection criterion for each of the attributes. The method may also include receiving, from one or more radio access network cells, a data stream comprising metrics for at least one of the cell or users in the cell, generating, based on the received request and the metrics, a list of zero or more cells that meet the selection criterion for one of the radio access network optimization services or for a group of the radio access network optimization services, and sending, to a respective one of said one or more radio access network optimization services, the generated list of said zero or more cells that meets the selection criterion for the respective one or more radio access network optimization services.

Another embodiment is directed to an apparatus that may include at least one processor and at least one memory comprising computer program code. The at least one memory and computer program code may be configured, with the at least one processor, to cause the apparatus at least to receive a request from one or more radio access network optimization services. The request may include a list of attributes corresponding to characteristics of a cell and a cell selection criterion for each of the attributes. The at least one memory and computer program code may be further configured, with the at least one processor, to cause the apparatus at least to receive, from one or more radio access network cells, a data stream comprising metrics for at least one of the cell or users in the cell, to generate, based on the received request and the metrics, a list of zero or more cells that meet the selection criterion for one of the radio access network optimization services or for a group of the radio access network optimization services, and to send, to a respective one of said one or more radio access network optimization services, the generated list of said zero or more cells that meets the selection criterion for the respective one or more radio access network optimization services.

Another embodiment is directed to an apparatus that may include circuitry configured to receive a request from one or more radio access network optimization services. The request may include a list of attributes corresponding to characteristics of a cell and a cell selection criterion for each of the attributes. The apparatus may also include circuitry configured to receive, from one or more radio access network cells, a data stream comprising metrics for at least one of the cell or users in the cell, circuitry configured to generate, based on the received request and the metrics, a list of zero or more cells that meet the selection criterion for one of the radio access network optimization services or for a group of the radio access network optimization services, and circuitry configured to send, to a respective one of said one or more radio access network optimization services, the generated list of said zero or more cells that meets the selection criterion for the respective one or more radio access network optimization services.

Another embodiment is directed to an apparatus that may include means for receiving a request from one or more radio access network optimization services. The request may include a list of attributes corresponding to characteristics of a cell and a cell selection criterion for each of the attributes. The apparatus may also include means for receiving, from one or more radio access network cells, a data stream comprising metrics for at least one of the cell or users in the cell, means for generating, based on the received request and the metrics, a list of zero or more cells that meet the selection criterion for one of the radio access network optimization services or for a group of the radio access network optimization services, and means for sending, to a respective one of said one or more radio access network optimization services, the generated list of said zero or more cells that meets the selection criterion for the respective one or more radio access network optimization services.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for enabling dynamic target cell selection for application of RAN optimization, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Some example embodiments may relate to an architecture being developed based on open application programming interfaces (APIs) that will allow radio resource management (RRM) algorithms and RAN optimization algorithms to be hosted on an open platform so as to interact with and guide the behavior of the RAN. This architecture may be referred to as extensible RAN (xRAN) controller or Radio Intelligent Controller (RIC) or other naming convention.

Figure 1:
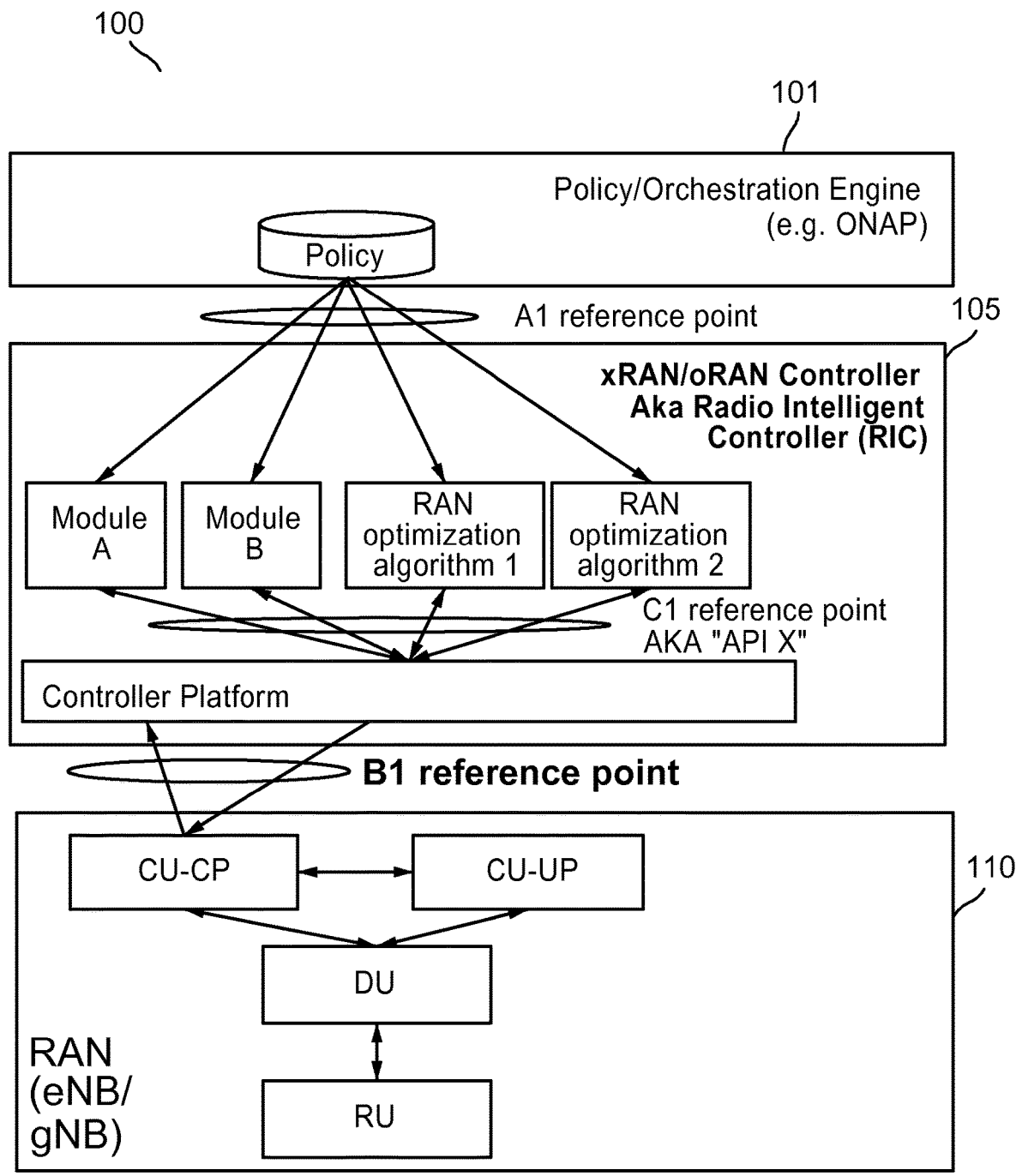
FIG. 1 illustrates an example system diagram depicting an example of an xRAN architecture, according to one example embodiment.

FIG. 1 illustrates an example system diagram depicting an example of an xRAN architecture 100, according to one example embodiment. As illustrated in the example of FIG. 1, the system 100 may include a policy and orchestration engine 101 that can interact with an xRAN controller/RIC 105 via an A1 reference point.

As also illustrated in the example of FIG. 1, one aspect of the architecture of the xRAN controller/RIC 105 is that the various RRM/optimization algorithms may be instantiated as services on top of an underlying controller platform. The services can interact with the platform by means of an "API X," which is also sometimes referred to as reference point "C1." This allows the xRAN controller/RIC 105 to be an open platform that can host an ecosystem of applications.

As further illustrated in the example of FIG. 1, the underlying RIC platform may provide the ability to interface to the RAN 110 by means of a reference point or interface B1 (sometimes known as E2), in order to receive information from the RAN 110 as well as to communicate information or control actions to the RAN 110. The RIC/controller platform can provide various underlying facilities, such as analytics and machine learning (ML) that may be used by various RAN optimization algorithms residing on top of the RIC platform.

Example embodiments described herein may provide an approach in which some of these services instantiated on the controller platform may be common programmable modules that can be invoked by multiple RRM/Optimization Algorithms. That is, these modules may be considered as common building blocks in the operation of multiple of the RRM/Optimization Algorithms.

An example embodiment provides one such module and a programmable API that may allow the module to suitably interact with multiple such RRM/Optimization algorithms or services. According to an example embodiment, in the xRAN or open RAN (oRAN) architecture, the module's API may map to API X/Reference point C1.

Therefore, as will be discussed in detail in the following, example embodiments provide a method and/or apparatus, which may include a module or unit, for identifying cells that would benefit from different RAN optimization algorithms while limiting data transfer and/or storage, as well as limiting computational complexity.

Figure 2:
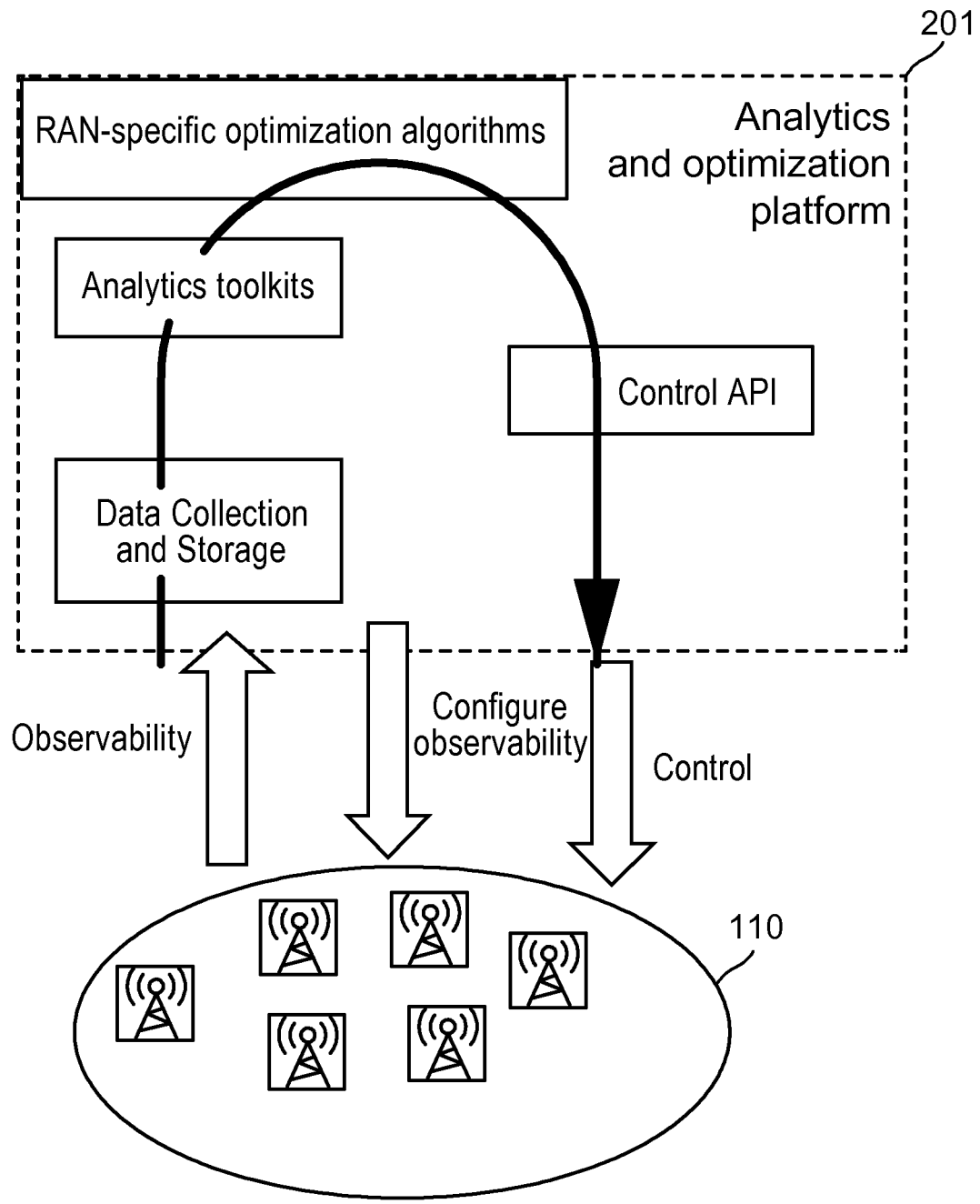
FIG. 2 illustrates an example block diagram of an analytics and optimization platform that may be included in an xRAN controller, according to some example embodiments.

FIG. 2 illustrates an example block diagram of an analytics and optimization platform 201 that may be included in an xRAN controller/RIC, according to some example embodiments. In an example embodiment, the analytics and optimization platform 201 may include a programmable API for RAN 110. For a network of cells, a RAN programmable API or RIC may be used to implement RAN optimization algorithms to improve the performance of the cells in the network.

It is noted that the cells whose characteristics are suitable to obtain benefits for a particular RAN optimization use-case algorithm may be quite different from the cells that are suitable to obtain benefits for some other RAN optimization algorithm. As one example, cells that can benefit from admission control optimization may be different from cells that benefit from PUCCH optimization. Further, it is computationally very burdensome to have each optimization operate on all cells all the time, in terms of the amount of data exposure from all cells (if using data based RAN optimizations) as well as the computational resources needed for the optimization algorithms. Hence, it is desirable to be selective about which cells are chosen for each particular optimization algorithm.

Figure 3:
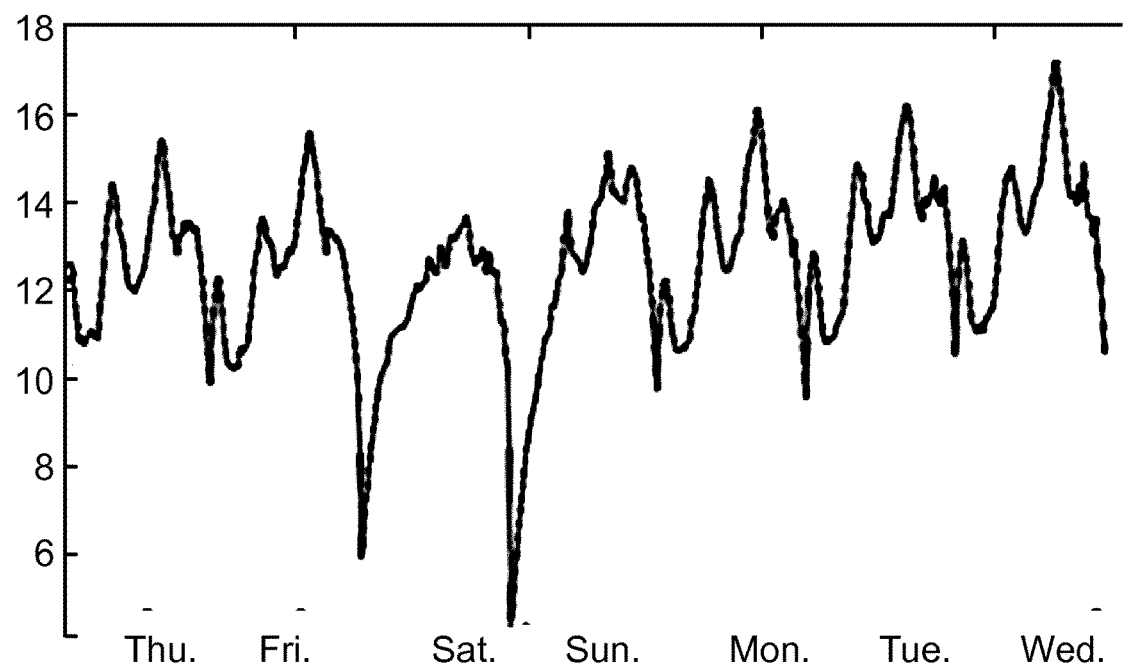
FIG. 3 illustrates an example of downlink (DL) physical resource block (PRB) utilization averaged over thousands of cells in a network, according to an example embodiment.
Figure 4:
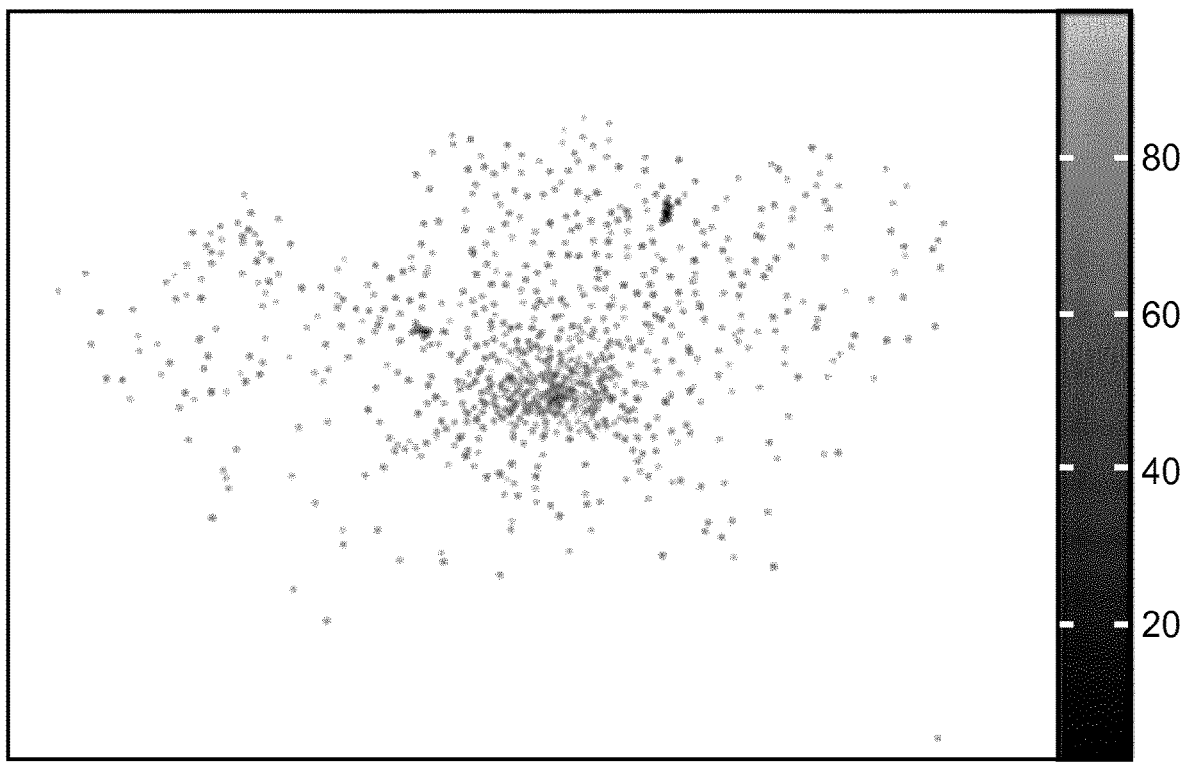
FIG. 4 illustrates an example of peak DL PRB utilization across cells, according to an example embodiment.

However, it is not practically feasible to perform this selection manually. There may be thousands of cells in the network with widely varying characteristics, and possibly many different optimization algorithms. Moreover, each cell's characteristics (e.g., load, SINR, mobility patterns, etc.) may be continuously changing over time. For instance, FIG. 3 illustrates an example of downlink (DL) physical resource block (PRB) utilization averaged over thousands of cells in a network. FIG. 4 illustrates an example of peak DL PRB utilization across cells. As can be seen from the examples of FIGS. 3 and 4, cell characteristics vary and may be frequently changing.

Hence, there is a need to devise an automated approach that enables dynamic selection of cells that are suitable for targeted optimization algorithms. In other words, when given a set of optimization algorithms A={A1, A2 . . . AN}, where A1 . . . AN are each a RAN optimization algorithm, and a set of network cells denoted by C, the problem is how to select a subset of network cells (i.e., C) that should use RAN optimization algorithm in the set A, so as to maximize network performance (e.g., using the analytics and optimization framework illustrated in FIG. 2), while also limiting storage, data transfer and computational requirement.

An example embodiment may be based on the observation that cells in the same network may differ from each other in a number of ways across time, as depicted in FIGS. 3 and 4. For example, different cells may have a different number of connected users and DL/UL PRB usage, different traffic patterns (e.g., signaling vs. data traffic, guaranteed bit rate (GBR) vs. non-GBR), different mobility patterns (e.g., pedestrian vs highway, number of handovers), different signal-to-interference and noise ratio (SINR) or channel quality indicator (CQI) distributions (e.g., users' spatial distribution, shadowing, indoor/outdoor, etc.), and/or different trends with respect to time variation for cell key performance indicators (KPIs).

Based on observed RAN data (e.g., KPIs), some RAN optimization algorithm(s) might yield no advantage or less of an advantage on some cells. For example, cells observed to have low load statistics of, e.g., 10%, may not gain from using congestion control optimization. Therefore, based on the cell performance KPIs and respective Configuration Management (CM) data, which may collectively be referred to as RAN data, at a coarse granularity (e.g., 15 or 30 minutes, or also more granular data such as 1 minute or even more granular), an example embodiment may dynamically identify (e.g., every day or asynchronously) which cells would be best suited for each RAN specific optimization algorithm using the Dynamic Cell Identification (DCI) provided by example embodiments.

According to certain example embodiments, the selective cell observability and RAN specific optimization for selective cells may significantly reduce the data transfer, data collection storage and computational requirement of the programmable API for RAN. As an extension of cell selection, some example embodiments may also perform user group selection in a cell in a similar way, using RAN data, as users differ from each other across time in certain ways, such as traffic, channel conditions, and/or mobility.

Therefore, some example embodiments provide a Dynamic Cell Identification (DCI) module configured to receive a request from a RAN Optimization service with a list of attributes corresponding to cell characteristics, and for each attribute, a selection criterion. In one example embodiment, the DCI module may then be configured to receive, from one or more RAN cells, a data stream containing metrics pertaining to the cell or to the users in the cell. According to an optional example embodiment, the DCI module may support an interface towards a data store containing past data/metrics of the cell or users in the cell. In an example embodiment, the DCI module may be further configured to generate, based on the received request and the metrics pertaining to the cell or to the users (RAN data) a list of cells that meet the selection criteria for a particular RAN optimization service. According to one example embodiment, the DCI module may then be configured to transmit, send or convey the list of cells meeting the selection criteria to the requesting RAN Optimization service.

Figure 5:
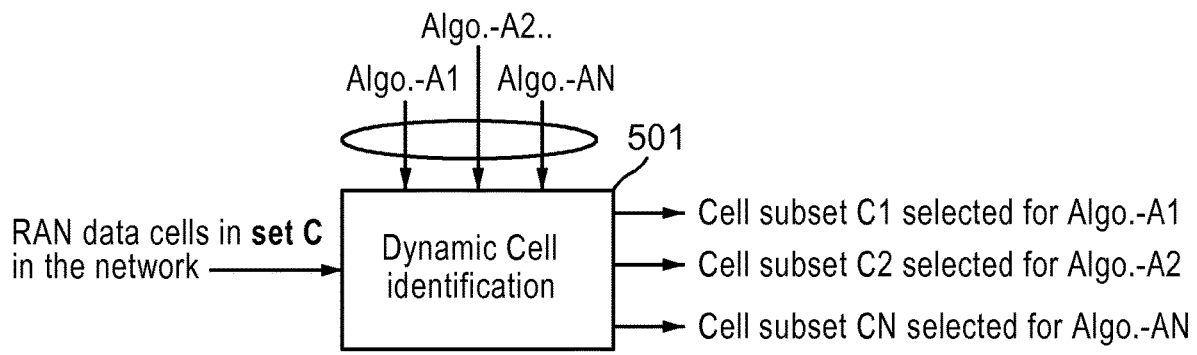
FIG. 5 illustrates an example block diagram of a dynamic cell identification (DCI) module, according to one example embodiment.

FIG. 5 illustrates an example block diagram of a DCI module 501, according to one example embodiment. In one example embodiment, the DCI module 501 may be configured to select the cells that would actually benefit from a RAN optimization algorithm, rather than using all RAN optimization algorithms for all the cells. As a result, certain example embodiments can scale down the data gathering and central processing unit (CPU) processing needed for the RAN optimization services, while still providing the benefit to the relevant cells. As one example to illustrate, based on observed RAN data, 400 (10%) cells out of 4000 may be chosen for physical uplink control channel (PUCCH) optimization algorithm and another 200 (5%) cells for admission control optimization algorithm. Of course, this is just one example and any number of other examples are also possible depending on the specific scenario. According to some example embodiments, DCI module 501 may be implemented as software, or as combination of software and hardware, and may be downloaded to an existing platform as illustrated in the example of FIG. 6.

Figure 6:
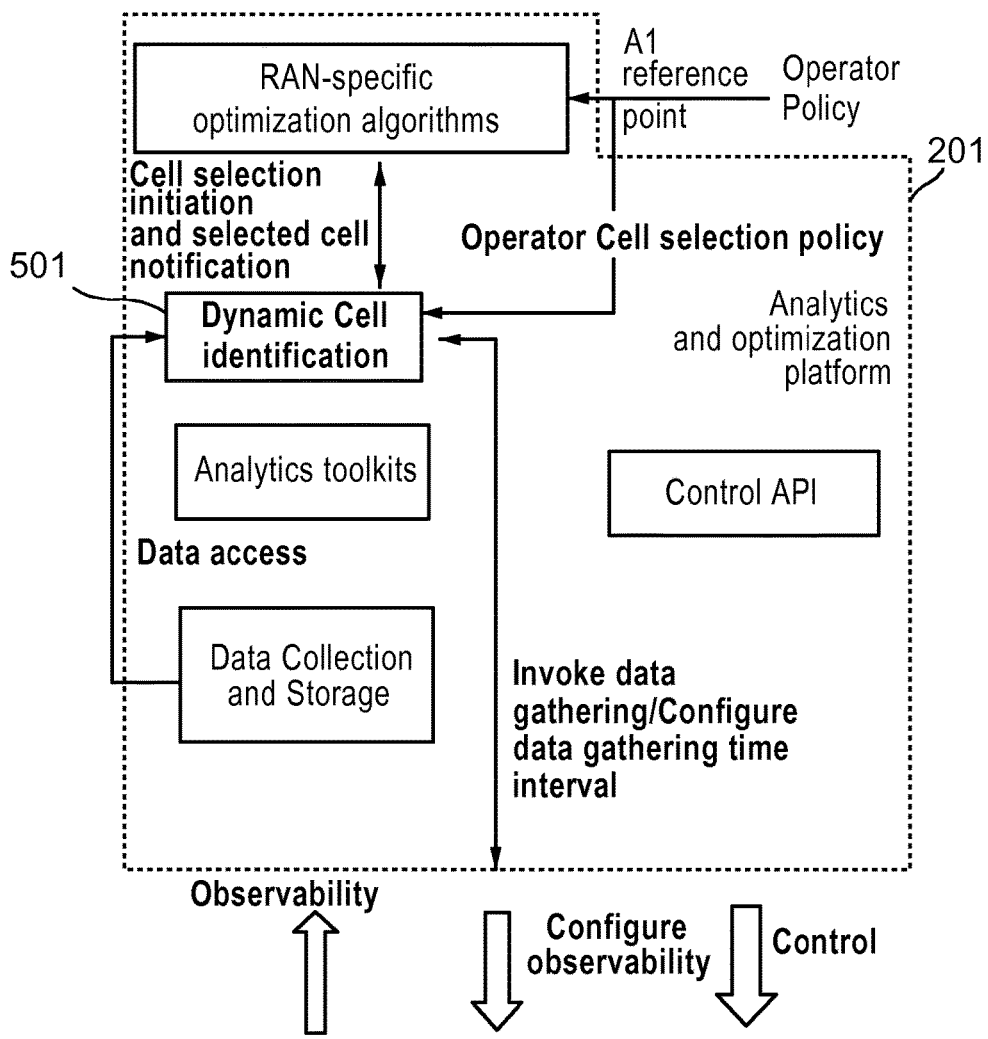
FIG. 6 illustrates an example DCI structure in an optimization platform, according to an example embodiment.

According to some example embodiments, DCI may be a module 501 (or microservice, or app) that sits on top of an underlying platform 201 as depicted in the example of FIG. 6. In an example embodiment, the platform 201 may provide the data gathering, control API, and analytics toolkits capabilities. This platform may be, for example, an xRAN/oRAN controller aka RIC. Other apps, such as RAN optimization algorithms, can also be modules, apps, mu-services on this platform 201.

In an example embodiment, apps may interact with the platform 201 by means of APIs to invoke the facilities that the platform 201 provides. For example, the platform 201 may provide APIs for a module to "talk" to the RAN, such as for data gathering and possibly for control. The DCI 501 may use the data gathering API, but not necessarily the control API (that would be invoked by the RAN optimization algorithm, after it has made optimization decisions).

In one example embodiment, an existing RAN optimization algorithm module or RAN optimization service may handshake with the DCI module using service discovery API. A RAN specific optimization algorithm module may initiate the cell selection and communicate, to the DCI module, the criterion for cell selection and corresponding PM statistics that may need to be collected using cell selection initiation and selected cell API. According to an example embodiment, the DCI module may next initiate the data collection, for example at 15/30 minute granularity or even 1 minute granularity, using a data collection initiation API, and then may access collected data using a data access API to further process and select cells. It is noted that, in an example, previously collected data from different cells may be also accessed by the data access API.

Once the cells have been selected by the DCI module, in one example embodiment, the DCI module may communicate the selected cells to a RAN optimization algorithm module using the cell selection initiation and selected cell API, and may initiate data collection at a lower time granularity (e.g., 1 minute or even lower time granularity), for the specific RAN optimization algorithm (as the algorithms may be data based) and their corresponding selected cells using a data collection initiation API. According to some example embodiments, the selection of cells for specific algorithms may be done (and hence the data collection) at a timescale of day/week or may be done more frequently (e.g., at an hourly) timescale in case of known special events, such as games/fireworks, etc. In one example, the time between two instances run of the DCI block (T_cs) may be chosen by the operator. Also, the operator may specify certain rules/constraints for cell selection, for example, upper-bound on percentage of selected cells in a particular geographical area, etc. This information from the operator may be exposed to the DCI using a policy API.

In some example embodiments, the DCI may also be configured to initiate the data collection in response to some preconfigured monitored events, alarms, faults or correlations across multiple parameters or across multiple software or hardware instances of the RAN components. According to certain example embodiments, the DCI may itself utilize some analytics, ML, or artificial intelligence (AI) and/or use historic data to predict cell sets for each algorithm faster or when for some reason partial or no data is available for some cells in the RAN for various reasons. As an example, it is possible that the DCI may utilize the services of the RAN optimization micro-service/module for this analysis. It is noted that, in an example embodiment, the RAN optimization algorithm modules or services and corresponding cell selection criterion may be modified, added and/or deleted by the RAN optimization algorithm module/RAN optimization service.

Figure 7:
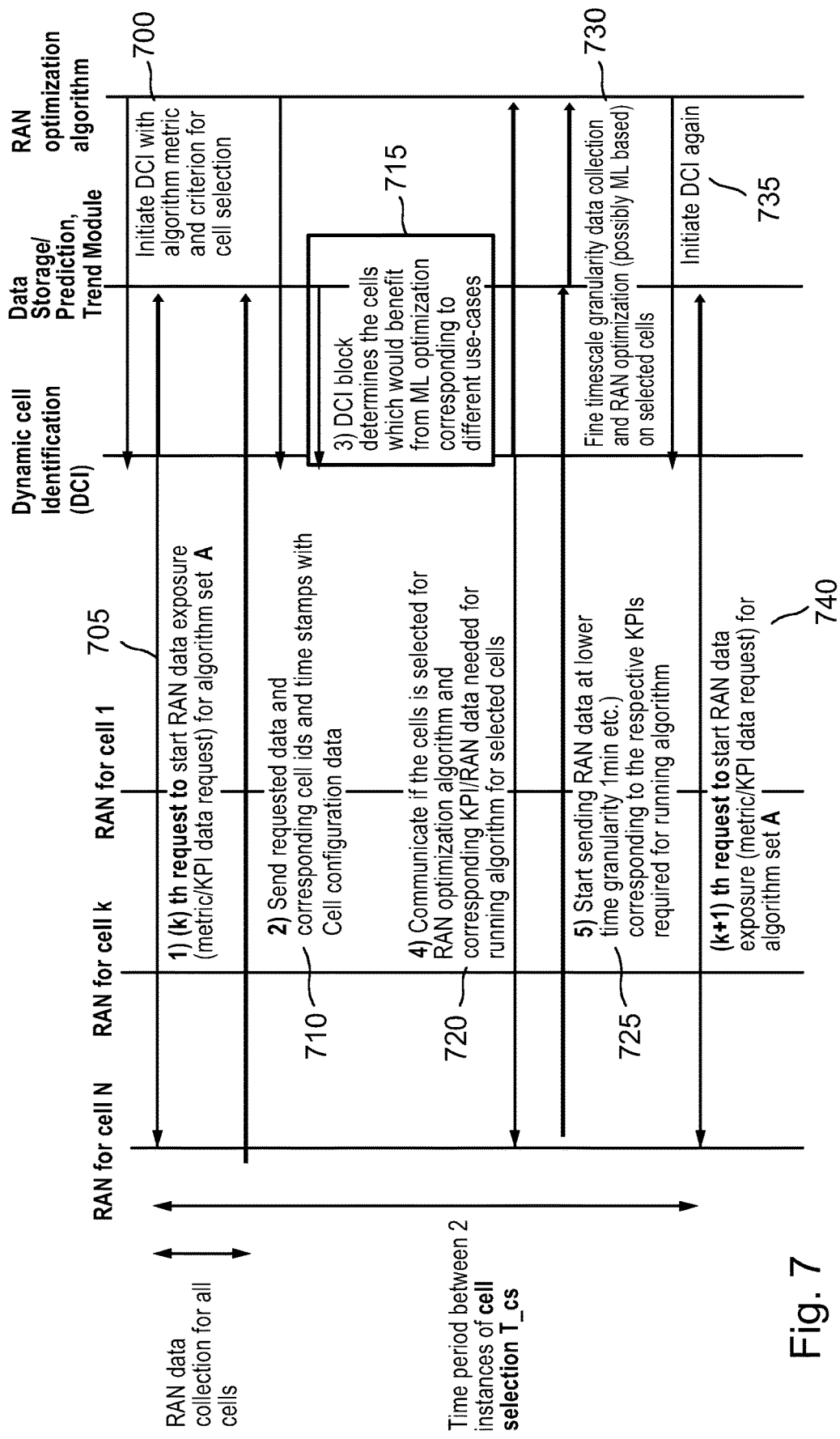
FIG. 7 illustrates an example of a messaging or signaling flow between different elements and the DCI, according to an example embodiment.

FIG. 7 illustrates an example of a messaging or signaling flow between different elements and the DCI, according to an example embodiment. As illustrated in the example of FIG. 7, at 700, a RAN optimization service or algorithm may initiate transmission, to the DCI, of attributes or metrics corresponding to cell characteristics and, for each attribute, a criterion for cell selection. Then, at 705, DCI may transmit, to the RAN for cell N (where cell N is an example cell), a request to start RAN data exposure (e.g., metric/KPI data request) for algorithm set A. At 710, RAN for cell N may send the requested data and corresponding cell IDs and time stamps with cell configuration data. The DCI may then determine and select, at 715, the cells which would benefit from RAN optimization service/algorithm corresponding to different use cases. After determining the cells that would benefit from ML optimization, at 720, the DCI may communicate the selected cells for RAN optimization service and the corresponding KPI/RAN data needed for running the optimization algorithm for the selected cells. At 725, the RAN may begin sending RAN data at lower time granularity corresponding to the respective KPIs required for running the optimization algorithm. At 730, fine timescale granularity data collection may be performed along with RAN optimization (possibly ML based) on selected cells. In an example embodiment, at 735, the RAN optimization service may again initiate DCI, which may in turn, at 740, transmit, to the RAN for cell N, a request to start RAN data exposure (e.g., metric/KPI data request) for identifying cells for algorithm set A.

In another example embodiment, the DCI may monitor the network and keep selected cells populated, for example, either based on requests from the RAN optimization service or periodically. According to some example embodiments, the sending of the selected cells to the RAN optimization service may be based on a request from RAN optimizer and/or triggered by a change in the set of cells based on cell monitoring.

According to example embodiments, one or more metrics may be used for cell selection by the DCI. In one example embodiment, a list of the metrics and/or criterion to be used by the DCI for cell selection may be communicated to the DCI by the RAN optimization algorithm/service. For instance, the metric(s) may include DL PRB usage, UL PRB usage, speed, number of RRC users, time trends, number of active users, spectral efficiency, handovers, mobility, channel quality statistics like Level crossing rate and Shadow fading, RSRP, user/cell location, traffic patterns, inter-site distance, Cell density, acknowledgement (ACK)/non-acknowledgements (NACKS) percentage, user battery, latency, timing advance, etc. It should be noted that this is not an exhaustive list of applicable metrics, as other metrics can be added based on the various RAN optimization algorithms/services as required. In the following, more detail is provided regarding some example metrics.

High DL PRB cell usage may be indicative of cells which would be of high interest for using RAN optimization, from the operator's point of view. Also, high PRB usage and low average throughput would indicate low spectral efficiency caused by a challenging cell environment and, hence, RAN optimization can be useful. For example, cells showing DL PRB usage in top 95 percentile across a day and entire the network may be a good candidate to be selected for the optimization. Some of the algorithms that high DL PRB usage can indicate is, for example, PUCCH optimization, admission control etc.

UL PRB usage in a cell and DL PRB usage may indicate the tradeoff where by taking a hit on UL, DL can gain or vice versa. For example, cells showing low UL PRB usage can step up the control resources on UL and gain on DL. Cells showing imbalance in DL and UL are the ones that may gain from the tradeoff on either DL/UL.

Regarding speed, the average cell speed may be an indicator of mobility in the cell. Intuitively normalized (with respect to average RRC users) inter-eNB handover (rather than total inter-eNB handovers) give a coarse idea about average per user mobility in a cell. Normalized handovers per cell per minute can be calculated, as observation time is known (15 minute/30 minute). The speed may also depend on the cell inter-site distance. Two cell topology with same number of handovers, cell with higher inter-site distance should have higher mobility users (as users travel more distance). On average inter-site distance between eNBs and two nearest eNB can be calculated to obtain the distance (d). The speed estimate is given by $2*d*H$, where H is number of handovers per user in 15-minute interval and d is the inter-site distance amongst eNBs. For d=1 km region, the velocity is given by 2 H km/hour and, for d=0.5 km region, the velocity is given by H Km/hour.

A high number of RRC users may be indicative of cells which would be of high interest for using RAN PUCCH or admission control optimization. Also, RRC users along with PRB usage trends can be used to identify cells where ML can help in optimizing the tradeoff between UL and DL throughput. For example, cells with lower number of RRC users accompanied with high DL PRB usage can report CQI at a faster CQI period to obtain high DL throughput without increasing control overhead in UL. Average RRC connected users in 15/30-minute interval and maximum RRC connected users in 15/30 min interval can be both useful for different use-case applications.

With respect to time trends, the top 10 percent of absolute value of difference of a KPI in consecutive time intervals (of 15 minute/30 minute) may provide an indicator of time variation of KPI in a cell. Cells with high time variation of KPIs may be of interest for ML optimization so the configuration parameters can be dynamic with respect to time, rather than cells with more or less fixed/static KPIs (as fixed configuration can be set in these cells rather than using ML). For example, a cell with varying load/speed etc. throughout the day would be of more interest for a ML based optimization as compared to a cell with constant high/low KPIs.

In an example embodiment, the metric values may be obtained from RAN data through B1 interface in xRAN (e.g., as illustrated in FIG. 6), which enables example embodiments to be potentially multi-vendor.

In the following, one example of PUCCH optimization dynamic cell identification using network data is provided. It is noted that this is merely one example used to illustrate some embodiments, and example embodiments are in no way limited to this example. In this example, it is assumed that dynamic cell selection (using real network data) for PUCCH optimization algorithm is performed using DCI block for a cellular network containing ~5000 cells, using DL PRB usage and cell speed (used to calculate suggested CQI period). According to this example, the PUCCH cell identification criterion communicated to DCI by RAN optimization algorithm module may indicate high DL PRB load (e.g., 40% or more obtained from top 10% cells corresponding to top 10% timestamps for each cell) and suggested CQI report period 20 msec or less and occurrence of this scenario for 15 or more times a week for a cell. Also, some example embodiments may make sure that PUCCH capacity is more than maximum RRC users (in 15 min. interval), otherwise UL PRB load is <30%. Further, in this example, the configuration data observation by DCI is that the cells have default CQI periodicity set to 40 msec. As a result, in this example, the PUCCH algorithm action may be to decrease the CQI feedback period (according to coherence time) for the cell while making sure that the PUCCH capacity is more than maximum RRC users in the cell for the 15-minute interval and, if not, then increase RB size to satisfy capacity constraints. As a result, DL throughput performance is improved. It is noted that, in this example, of the ~5000 cells, based on these criterion, the DCI would select 214 cells which is only 2.7% of the total cells thereby reducing the CPU usage and traffic generated etc. for (100-2.7)% of the cells.

Figure 8:
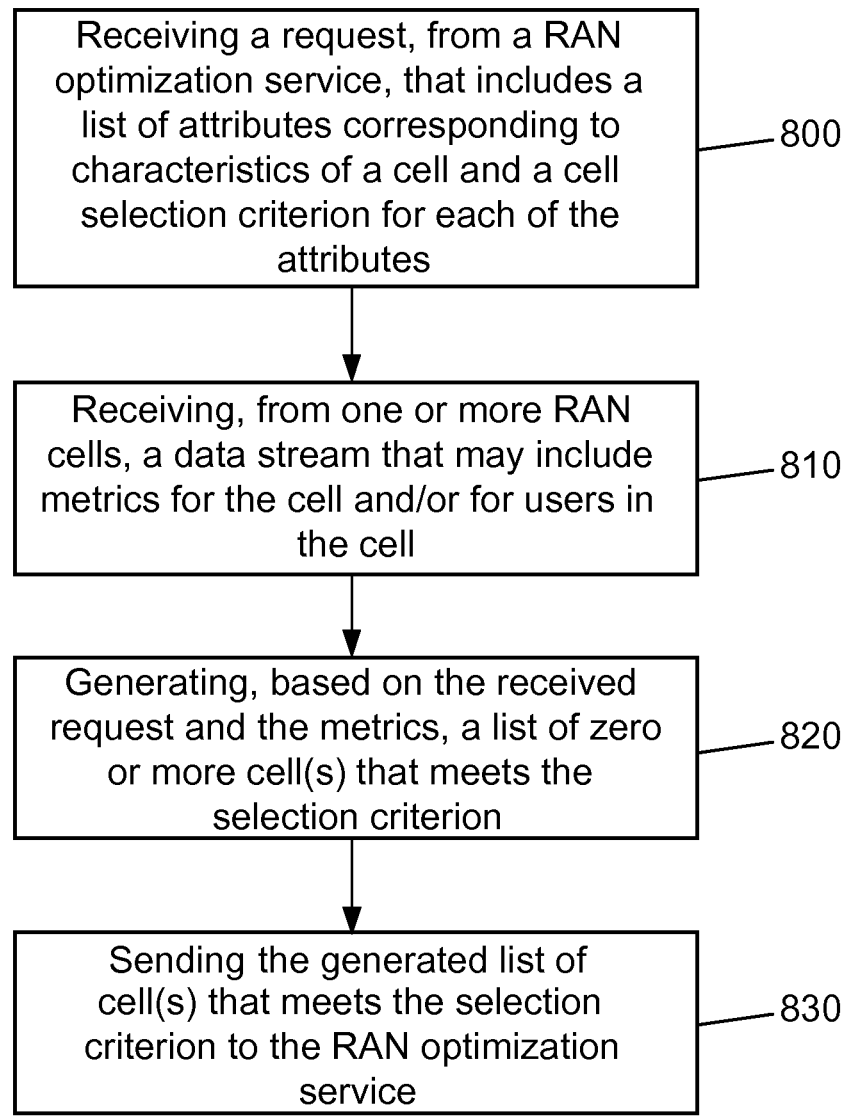
FIG. 8 illustrates an example flow diagram of a method, according to one example embodiment.

FIG. 8 illustrates an example flow diagram of a method for dynamically identifying and/or selecting cell(s) that would benefit from RAN optimization, according to one example embodiment. In certain example embodiments, the flow diagram of FIG. 8 may be performed by a DCI module or device. According to an example embodiment, the DCI device may be included in a network node, such as a base station, node B, eNB, gNB, or any other access node, or one or more servers in a 5GC or cloud configuration, for instance. In some example embodiments, the method of FIG. 8 may be performed by the DCI illustrated in FIG. 5, 6 or 7, respectively. According to another example embodiment, the method of FIG. 8 may be performed by a RIC. In some examples, the RIC may reside partially in the RAN, completely outside the RAN, e.g., on a dedicated or cloud/virtual hardware.

As illustrated in the example of FIG. 8, the method may include, at 800, receiving a request from one or more RAN optimization services. The request may include a list of attributes corresponding to characteristics of a cell and a cell selection criterion for each of the attributes. In one example, the method may optionally include performing a handshake with the RAN optimization service using a service discovery API. For instance, in an example embodiment, the receiving 800 may include receiving, from the RAN optimization service(s) that initiates the cell selection, the criterion for cell selection and corresponding PM/KPI statistics that may need to be collected using a cell selection initiation and cell selection API.

According to an example embodiment, the method may also include, at 810, receiving, from one or more RAN cells, a data stream that may include metrics for the cell and/or for users in the cell. According to some example embodiments, the metrics may include one or more of DL PRB usage, UL PRB usage, speed, number of RRC users, time trends, number of active users, spectral efficiency, handovers, mobility, channel quality statistics including level crossing rate and shadow fading, reference signal received power, user or cell location, traffic patterns, inter-site distance, cell density, acknowledgement/non-acknowledgement percentage, user battery, latency, and/or timing advance. In one example embodiment, the method may also include, at 820, generating, based on the received request and the metrics, a list of zero or more cell(s) that meet the selection criterion for one of the radio access network optimization service(s) or for a group of the radio access network optimization service(s). In some example embodiments, the list may include at least one cell that meets the selection criterion.

In one example embodiment, the method may further include supporting an interface towards a data storage or prediction/trend entity that may store past data and/or past metrics, or trends, patters, or predictions derived from the past data or past metrics, for the cell and/or for users of the cell. According to this example embodiment, the generating 820 may further include using the past data and/or the past metrics for generating the list of the cell(s) that meets the selection criterion.

According to some example embodiments, the method may include initiating collection of data for the attributes and accessing the collected data for selecting the cell(s) for inclusion in or exclusion from the list of cell(s) that meets the selection criterion. In certain example embodiments, the collection of data and/or the selecting of the at least one cell may be performed at varying time scales, time granularity, or different time scales for each of the radio access network optimization services (possibly at cell level). For example, the data collection may be initiated at 15 minute/30 minute granularity or 1 minute granularity, using a data collection initiation API. In an example embodiment, the method may then include accessing collected data using a data access API to further process and select cells. According to one example, previously collected data from different cells may be also accessed by the data access API.

According to certain example embodiments, the initiating of the collection of data may be performed in response to preconfigured monitored events, alarms, faults, correlations, or RAN optimization service initiation, across multiple parameters or across multiple software or hardware instances of the RAN components. In some example embodiments, the method may optionally include utilizing some analytics, ML, or artificial intelligence (AI) and/or historic data for faster prediction of cell sets for each optimization service or when partial or no data is available for some cells in the RAN for some reason.

In an example embodiment, the method may further include, at 830, transmitting or sending, to a respective one of the radio access network optimization service(s), the generated list of (zero or more) cell(s) that meet the selection criterion for the respective RAN optimization service(s). For example, in one example embodiment, the transmitting 830 may include communicating the selected cells to the RAN optimization service using the cell selection initiation and selected cell API, and initiating data collection at a lower time granularity (e.g., 1 minute or even lower time granularity), for the specific RAN optimization service and their corresponding selected cells using a data collection initiation API. According to some example embodiments, the initiating of the selection of cells for a specific optimization service (and the data collection) may be performed at a timescale of day/week or may be done more frequently (e.g., at an hourly) timescale, e.g., in case of known special events, such as games/fireworks, etc.

Figure 9:
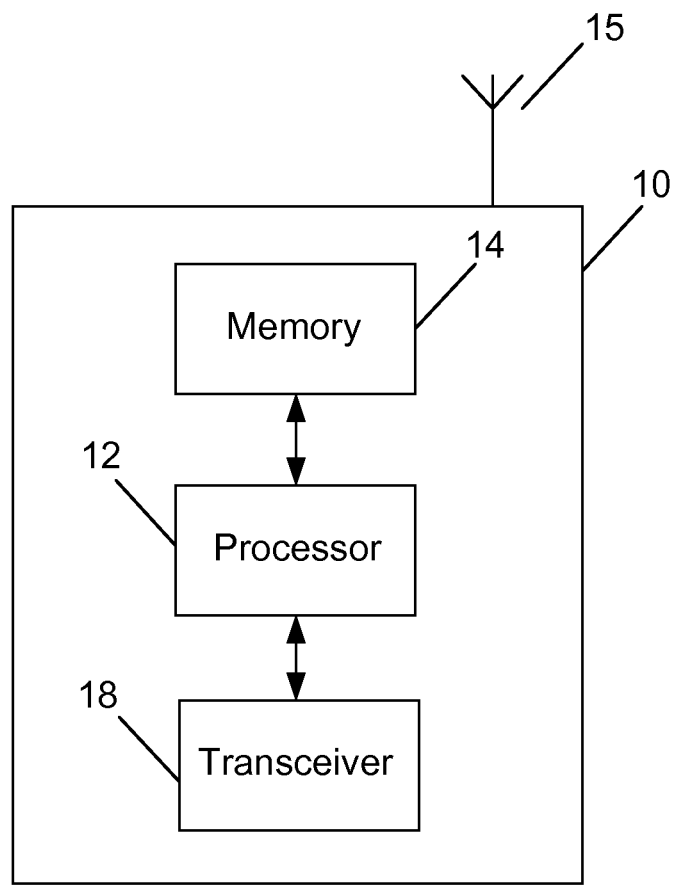
FIG. 9 illustrates an example block diagram of an apparatus, according to one example embodiment.

FIG. 9 illustrates an example of an apparatus 10 according to an example embodiment. In an example embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a LTE network, 5G or NR or other radio systems which might benefit from an equivalent procedure. In one example embodiment, apparatus 10 may be or may include a DCI device or module. According to another example embodiment, apparatus 10 may be a RIC or may be included in a RIC. In some examples, the RIC may reside partially in the RAN, completely outside the RAN, e.g., on a dedicated or cloud/virtual hardware. According to one example, data from RAN may be transferred over a backhaul (e.g., wired/wireless/optical).

Thus, it should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 9.

As illustrated in the example of FIG. 9, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. In further example embodiments, processor 12 may include a specialized processor or a ML/data analytics based application processor, such as a graphics processing unit (GPU) or tensor processing unit (TPU). In yet a further example, processor 12 may include a neural network or long short term memory (LSTM) architecture or hardware, etc.

While a single processor 12 is shown in FIG. 9, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. In certain example embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an example embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some example embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, BT-LE, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). Transceiver 18 may comprise one or more RF chains for down and/or upconverting RF signals, for example comprising diplexers, front end RF amplifiers, mixers, filters, voltage controlled oscillators and the like, the activation of part or all of which may be activated in accordance with example embodiments.

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device).

In an example embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some example embodiments, processor 12 and memory 14 may be included in or may form a part of processing circuitry or control circuitry. In addition, in some example embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in example embodiments, apparatus 10 may be a network node or RAN node, such as a base station, access point, Node B, eNB, gNB, WLAN access point, or the like. In one example, apparatus 10 may be a gNB and/or CU-CP in a RRC layer. According to an example embodiment, apparatus 10 may be or may comprise a DCI device or module. For instance, in one example embodiment, the DCI module may be stored in memory 14. In a further example embodiment, apparatus 10 may be or may be included in a RIC.

According to example embodiments, apparatus 10 may be controlled by memory 14 and processor 12 to perform the functions associated with any of the example embodiments described herein, such as the system or signaling flow diagrams illustrated in FIG. 1, 2, 5 6, 7, or 8. For example, in certain embodiments, apparatus 10 may be controlled by memory 14 and processor 12 to perform one or more of the steps performed by the DCI in FIG. 7. In example embodiments, for instance, apparatus 10 may be configured to perform a process for dynamically identifying and/or selecting cell(s) that may benefit from RAN optimization.

For instance, in some example embodiments, apparatus 10 may be controlled by memory 14 and processor 12 to receive a request from one or more RAN optimization services. The request may include a list of attributes corresponding to characteristics of a cell and a cell selection criterion for each of the attributes. In one example, apparatus 10 may be controlled by memory 14 and processor 12 to optionally perform a handshake with the RAN optimization service using a service discovery API. For instance, in an example embodiment, apparatus 10 may be controlled by memory 14 and processor 12 to receive, from the RAN optimization service(s) that initiates the cell selection, the criterion for cell selection and corresponding PM statistics that may need to be collected using a cell selection initiation and selected cell API.

According to an example embodiment, apparatus 10 may be controlled by memory 14 and processor 12 to receive, from one or more RAN cells, a data stream that may include metrics for the cell and/or for users in the cell. According to some example embodiments, the metrics may include one or more of DL PRB usage, UL PRB usage, speed, number of RRC users, time trends, number of active users, spectral efficiency, handovers, mobility, channel quality statistics including level crossing rate and shadow fading, reference signal received power, user or cell location, traffic patterns, inter-site distance, cell density, acknowledgement/non-acknowledgement percentage, user battery, latency, and/or timing advance. In one example embodiment, apparatus 10 may be controlled by memory 14 and processor 12 to generate, based on the received request and the metrics, a list of zero or more cell(s) that meet the selection criterion for one of the radio access network optimization service(s) or for a group of the radio access network optimization service(s). In some example embodiments, the list may include at least one cell that meets the selection criterion.

In one example embodiment, apparatus 10 may be controlled by memory 14 and processor 12 to support an interface towards a data storage or prediction/trend entity that may store past data and/or past metrics, or trends, patters, or predictions derived from the past data or past metrics, for the cell and/or for users of the cell. According to this example embodiment, apparatus 10 may be controlled by memory 14 and processor 12 to use the past data and/or the past metrics for generating the list of the cell(s) that meets the selection criterion.

According to some example embodiments, apparatus 10 may be controlled by memory 14 and processor 12 to initiate collection of data for the attributes and to access the collected data to select the cell(s) for inclusion in or exclusion from the list of cell(s) that meets the selection criterion. In certain example embodiments, apparatus 10 may be controlled by memory 14 and processor 12 to collect the data and/or select the cell(s) at varying time scales, time granularity, or different time scale for each of the radio access network optimization services. For example, the data collection may be initiated at 15 minute/30 minute granularity or 1 minute granularity, using a data collection initiation API. In an example embodiment, apparatus 10 may be controlled by memory 14 and processor 12 to access collected data using a data access API to further process and select cells. According to one example, previously collected data from different cells may be also accessed via the data access API.

According to certain example embodiments, apparatus 10 may be controlled by memory 14 and processor 12 to initiate the collection of data in response to preconfigured monitored events, alarms, faults, correlations, or RAN optimization service initiation, across multiple parameters or across multiple software or hardware instances of the RAN components. In some example embodiments, apparatus 10 may be controlled by memory 14 and processor 12 to optionally utilize some analytics, ML, or AI and/or historic data for faster prediction of cell sets for each optimization service or when partial or no data is available for some cells in the RAN for some reason.

In an example embodiment, apparatus 10 may be controlled by memory 14 and processor 12 to transmit or send, to a respective one of the radio access network optimization service(s), the generated list of cell(s) that meet the selection criterion for the respective RAN optimization service(s). For example, in one example embodiment, apparatus 10 may be controlled by memory 14 and processor 12 to communicate the selected cell(s) to the RAN optimization service using the cell selection initiation and selected cell API, and to initiate data collection at a lower time granularity (e.g., 1 minute or even lower time granularity), for the specific RAN optimization service and their corresponding selected cells using a data collection initiation API. According to some example embodiments, apparatus 10 may be controlled by memory 14 and processor 12 to initiate the selection of cells for a specific optimization service (and the data collection) at a timescale of day/week or more frequently (e.g., at an hourly) timescale, e.g., in case of known special events, such as games/fireworks, etc.

Therefore, certain example embodiments provide several technical improvements, enhancements, and/or advantages. Various example embodiments can, for example, enhance the performance of cell selection for RAN optimization, improve resource usage and reduce power consumption. For instance, some example embodiments are able to provide automated and/or dynamic selection of cells for application of a RAN ML solution to a network, and/or provide common behavior across a multi-vendor deployment. Further, example embodiments provide better scaling, lower power consumption and better costs for open RAN solutions.

Consequently, certain example embodiments may improve network performance and network energy efficiency. As such, example embodiments can improve performance, latency, and/or throughput of networks and network nodes including, for example, access points, base stations/eNBs/gNBs, and mobile devices or UEs. Accordingly, the use of certain example embodiments results in improved functioning of communications networks and their nodes.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the example embodiments as discussed above may be practiced with steps in a different order, and/or with hardware elements in configurations which are different than those which are disclosed. Therefore, although some embodiments have been described based upon these example preferred embodiments, it would be apparent to those of skill in the art that certain modifications, variations, and alternative constructions would be apparent, while remaining within the spirit and scope of example embodiments. In order to determine the metes and bounds of the example embodiments, therefore, reference should be made to the appended claims.

We claim:

1. A method, comprising:
   receiving a request from one or more radio access network optimization services, wherein the request comprises a list of attributes corresponding to characteristics of a cell and a cell selection criterion for each of the attributes;
   receiving, from one or more radio access network cells, a data stream comprising metrics for at least one of the cell or users in the cell;
   initiating data collection of data for the attributes;
   accessing the collected data;
   generating, based on the received request and the metrics, a list of zero or more cells that meet the selection criterion for one of the radio access network optimization services or for a group of the radio access network optimization services, wherein the initiating collection of data for the attributes and the accessing the collected data is for selecting at least one cell for inclusion in or exclusion from the list of said at least one cell that meets the selection criterion; and
   sending, to a respective one of said one or more radio access network optimization services, the generated list of said zero or more cells that meets the selection criterion for the respective one or more radio access network optimization services.

2. The method according to claim 1, further comprising supporting an interface towards a data store or prediction/ trend entity comprising at least one of past data or past metrics, or trends, patterns, or predictions derived from the past data or past metrics of the cell or users of the cell.

3. The method according to claim 2, wherein the generating further comprises using said at least one of the past data or the past metrics to generate the list of said at least one cell that meets the selection criterion.

4. The method according to claim 1, wherein at least one of the data collection of data or the selecting of the at least one cell are performed at varying time scales, time granularity, or different time scale for each of the radio access network optimization services.

5. The method according to claim 1, wherein the initiating comprises initiating the data collection of the data in response to preconfigured monitored events, alarms, faults or correlations, or radio access network optimization service initiation.

6. The method according to claim 1, wherein the metrics comprise at least one of: downlink physical resource block usage, uplink physical resource block usage, speed, number of radio resource control users, time trends, number of active users, spectral efficiency, handovers, mobility, channel quality statistics including level crossing rate and shadow fading, reference signal received power, user or cell location, traffic patterns, inter-site distance, cell density, acknowledgement/non-acknowledgement percentage, user battery, latency, or timing advance.

7. The method according to claim 1, wherein the receiving comprises receiving the request using a cell selection initiation and selected cell application programming interface.

8. The method according to claim 1, further comprising performing handshake with the radio access network optimization service using a service discovery application programming interface.

9. An apparatus, comprising:
at least one processor; and
at least one memory comprising computer program code, the at least one memory and computer program code configured, with the at least one processor, to cause the apparatus at least to
receive a request from one or more radio access network optimization services, wherein the request comprises a list of attributes corresponding to characteristics of a cell and a cell selection criterion for each of the attributes;
receive, from one or more radio access network cells, a data stream comprising metrics for at least one of the cell or users in the cell;
initiate data collection of data for the attributes;
access the collected data;
generate, based on the received request and the metrics, a list of zero or more cells that meet the selection criterion for one of the radio access network optimization services or for a group of the radio access network optimization services, wherein the initiating collection of data for the attributes and the accessing the collected data is for selecting at least one cell for inclusion in or exclusion from the list of said at least one cell that meets the selection criterion; and
send, to a respective one of said one or more radio access network optimization services, the generated list of said zero or more cells that meets the selection criterion for the respective one or more radio access network optimization services.

10. The apparatus according to claim 9, wherein the at least one memory and computer program code are further configured, with the at least one processor, to cause the apparatus at least to support an interface towards a data store or prediction/trend entity comprising at least one of past data or past metrics, or trends, patterns, or predictions derived from the past data or past metrics of the cell or users of the cell.

11. The apparatus according to claim 10, wherein the at least one memory and computer program code are further configured, with the at least one processor, to cause the apparatus at least to use said at least one of the past data or the past metrics to generate the list of said at least one cell that meets the selection criterion.

12. The apparatus according to claim 9, wherein at least one of the data collection of data or the selecting of the at least one cell are performed at varying time scales, time granularity, or different time scale for each of the radio access network optimization services.

13. The apparatus according to claim 9, wherein the at least one memory and computer program code are further configured, with the at least one processor, to cause the apparatus at least to initiate the data collection of the data in response to preconfigured monitored events, alarms, faults or correlations, or radio access network optimization service initiation.

14. The apparatus according to claim 9, wherein the metrics comprise at least one of: downlink physical resource block usage, uplink physical resource block usage, speed, number of radio resource control users, time trends, number of active users, spectral efficiency, handovers, mobility, channel quality statistics including level crossing rate and shadow fading, reference signal received power, user or cell location, traffic patterns, inter-site distance, cell density, acknowledgement/non-acknowledgement percentage, user battery, latency, or timing advance.

15. The apparatus according to claim 9, wherein the at least one memory and computer program code are further configured, with the at least one processor, to cause the apparatus at least to receive the request using a cell selection initiation and selected cell application programming interface.

16. The apparatus according to claim 9, wherein the at least one memory and computer program code are further configured, with the at least one processor, to cause the apparatus at least to perform a handshake with the radio access network optimization service using a service discovery application programming interface.

17. An apparatus, comprising:
circuitry configured to receive a request from one or more radio access network optimization services, wherein the request comprises a list of attributes corresponding to characteristics of a cell and a cell selection criterion for each of the attributes;
circuitry configured to receive, from one or more radio access network cells, a data stream comprising metrics for at least one of the cell or users in the cell;
circuitry configured to initiate data collection of data for the attributes;
circuitry configured to access the collected data;
circuitry configured to generate, based on the received request and the metrics, a list of zero or more cells that meet the selection criterion for one of the radio access network optimization services or for a group of the radio access network optimization services, wherein the circuitry configured to initiate collection of data for the attributes and the circuitry configured to access the collected data is for selecting at least one cell for inclusion in or exclusion from the list of said at least one cell that meets the selection criterion; and circuitry configured to send, to a respective one of said one or more radio access network optimization services, the generated list of said zero or more cells that meets the selection criterion for the respective one or more radio access network optimization services.

18. A computer program embodied on a non-transitory computer readable medium, said computer program comprising program instructions stored thereon which, when executed on an apparatus, cause the apparatus to perform at least the following:

receiving a request from one or more radio access network optimization services, wherein the request comprises a list of attributes corresponding to characteristics of a cell and a cell selection criterion for each of the attributes;

receiving, from one or more radio access network cells, a data stream comprising metrics for at least one of the cell or users in the cell;

initiating data collection of data for the attributes;

accessing the collected data;

generating, based on the received request and the metrics, a list of zero or more cells that meet the selection criterion for one of the radio access network optimization services or for a group of the radio access network optimization services, wherein the initiating collection of data for the attributes and the accessing the collected data is for selecting at least one cell for inclusion in or exclusion from the list of said at least one cell that meets the selection criterion; and sending, to a respective one of said one or more radio access network optimization services, the generated list of said zero or more cells that meets the selection criterion for the respective one or more radio access network optimization services.

* * * * *